(12) United States Patent
Crosbie et al.

(10) Patent No.: US 7,577,998 B1
(45) Date of Patent: Aug. 18, 2009

(54) METHOD OF DETECTING CRITICAL FILE CHANGES

(75) Inventors: Mark Crosbie, San Jose, CA (US); Benjamin Kuperman, West Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1185 days.

(21) Appl. No.: 09/987,911

(22) Filed: Nov. 16, 2001

(51) Int. Cl.
*G06F 12/14* (2006.01)
*G06F 7/00* (2006.01)
*G06B 23/00* (2006.01)

(52) U.S. Cl. .................... 726/27; 726/23; 713/187; 707/9

(58) Field of Classification Search ............ 713/187, 713/188, 200; 726/23
See application file for complete search history.

(56) References Cited

U.S. PATENT DOCUMENTS

| | | | |
|---|---|---|---|
| 6,279,113 B1 * | 8/2001 | Vaidya | 726/23 |
| 6,405,318 B1 * | 6/2002 | Rowland | 713/200 |
| 6,453,419 B1 * | 9/2002 | Flint et al. | 726/3 |
| 6,647,400 B1 * | 11/2003 | Moran | 707/205 |
| 6,996,843 B1 * | 2/2006 | Moran | 726/23 |
| 7,007,301 B2 * | 2/2006 | Crosbie et al. | 726/23 |
| 7,024,694 B1 * | 4/2006 | Ko | 726/23 |
| 7,080,250 B2 * | 7/2006 | Calvert | 713/168 |
| 7,099,866 B1 * | 8/2006 | Crosbie et al. | 707/9 |
| 7,134,141 B2 * | 11/2006 | Crosbie et al. | 726/23 |
| 2008/0010681 A1 * | 1/2008 | Armingaud et al. | 726/23 |

OTHER PUBLICATIONS

Kim, Gene H.; Spafford, Eugene H. The Design and Implementation of Tripwire: A File System Integrity Checker. Nov. 1994. ACM. CCS '94. pp. 18-29.*

* cited by examiner

*Primary Examiner*—Kaveh Abrishamkar

(57) ABSTRACT

The present invention is used to monitor a user specified set of files for successful attempts to change the content. Templates are used to monitor user specified directories (with exclusion rules) for successful attempts to change the content or the addition/deletion of files.

17 Claims, 2 Drawing Sheets

METHOD OF DETECTING CRITICAL FILE CHANGES

RELATED APPLICATIONS

The present application is related to co-pending patent application entitled "COMPUTER ARCHITECTURE FOR AN INTRUSION DETECTION SYSTEM", filed Jun. 12, 2001, Ser. No. 09/878,320, and is hereby incorporated by reference into this specification in its entirety.

The present application is related to patent application entitled "COMPUTER ARCHITECTURE FOR AN INTRUSION DETECTION SYSTEM", filed Jun. 12, 2001, Ser. No. 09/878,319, and is hereby incorporated by reference into this specification in its entirety.

The present application is related to co-pending patent application entitled "METHOD OF GENERATING AND PRESENTING KERNEL DATA" Ser. No. 09/987,912 and assigned to the instant assignee and filed on even date herewith and is hereby incorporated by reference into this specification in its entirety.

FIELD OF THE INVENTION

The present invention relates generally to intrusion detection systems, and more particularly, to a method of detecting critical file changes to detect and/or prevent intrusions.

BACKGROUND OF THE INVENTION

Many of the files on a UNIX system should not be modified during normal operation. This includes the various configuration options, system supplied binaries and libraries, and the kernel. Additionally, the software packages are generally not installed or modified during a system run. However, when an attacker breaks into a system, they frequently will create backdoors to let themselves in later. Also, they might use a "rootkit" to modify the system binaries such that they do not report the changes that were made.

SUMMARY OF THE INVENTION

The present invention is used to monitor a user specified set of files for successful attempts to change the content. Templates are used to monitor user specified directories (with exclusion rules) for successful attempts to change the content or the addition/deletion of files.

The present invention is used to monitor for changes of owners or file permissions of the specified files, and logs an alert only if an actual change to the permissions/owner occurs.

These and other objects of the present invention are achieved by a method of detecting critical file changes, including reading events representing various types of system calls, routing the event to an appropriate template with the event having multiple parameters. The event is filtered as either a possible intrusion based on the multiple parameters. The event is either dropped or output from the filter. An intrusion alert is created if an event is output from the filtering step.

The foregoing and other objects of the present invention a method of detecting critical file changes, including reading events including encoded information representing system calls. The event is routed to an appropriate template based on the encoded information. The event is routed as either a possible intrusion based on the encoded information and either the event is output or dropped. An intrusion alert is created of an event output from said filtering step.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
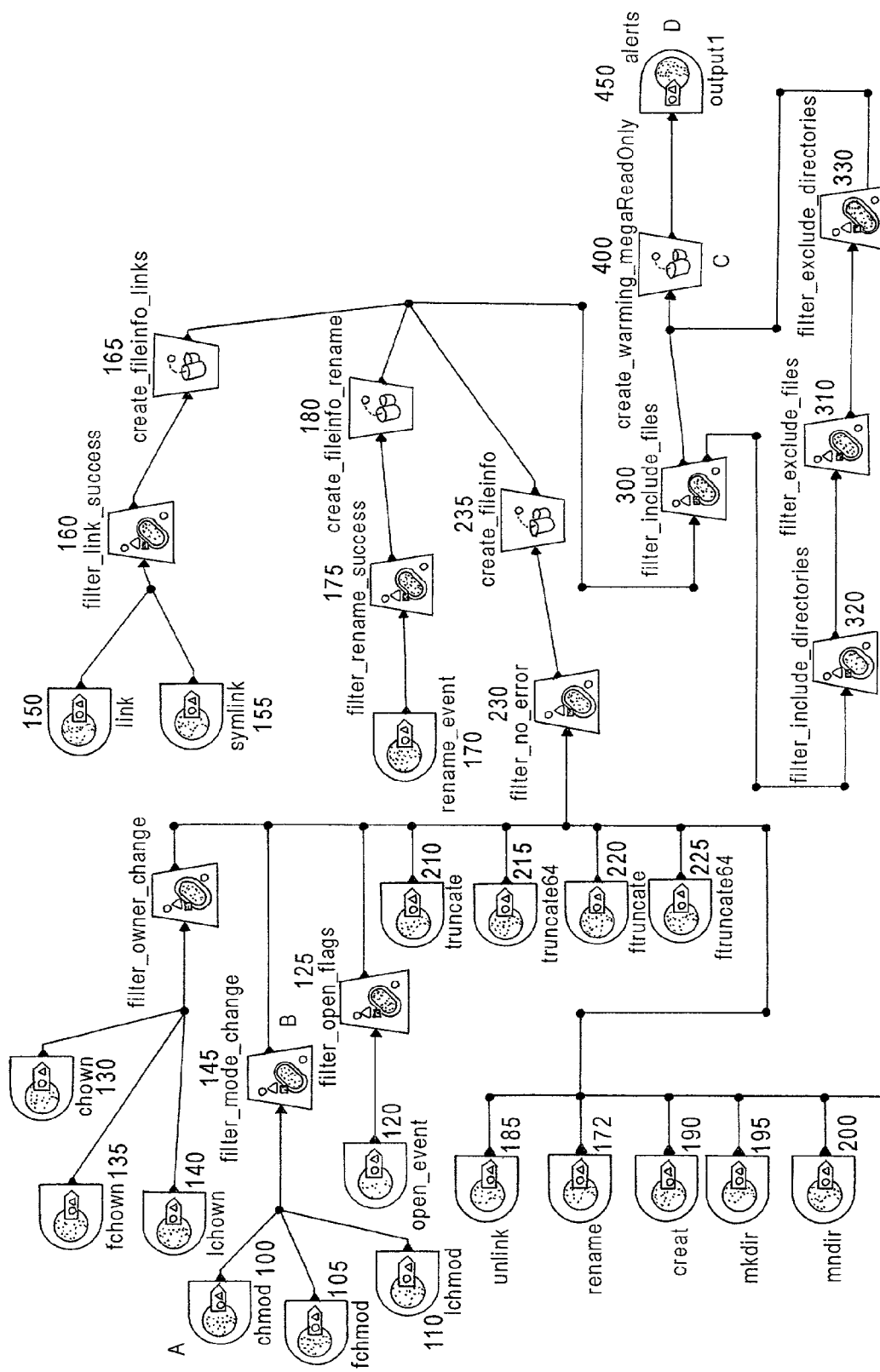
FIG. 1 is an event flow model illustrating input notes, filter nodes, create nodes and output nodes according to the present invention

FIG. 1 presents a visual overview of the template design based on an "event flow" model. Events flow from left-to-right through the nodes in the figures, and they only flow along the connecting lines.

When an event arrives at the input port (on the left hand side) of a node indicated by the letter "A" in FIG. 1, it is processed by that node's logic. The logic embedded in the nodes in the event flow diagram contains the algorithm used to detect file and directory changes.

An event may leave a node on its output port (on the right hand side). Some nodes may create a new event on their output ports, others may forward the event that arrived at their input port. Some nodes (filter nodes) may block the input event from transitioning onto the output port.

"Events" in this context are kernel audit records read from the IDDS subsystem described in greater detail below. Each event contains exactly one kernel audit record, which pertains to exactly one system call invocation by a process. As described in the IDDS patent applications entitled "METHOD OF GENERATING AND REPRESENTING KERNEL DATA" AND "CIRCUITS FOR INTRUSION DETECTION SYSTEM", a kernel audit record contains a number of fixed header fields, followed by a variable body portion. Each field in the fixed header, and in the variable body portion, has an entry in the event structure used in the template according to the present invention.

The type of an event is equivalent to the system call information encoded in the event. For example, an open( ) system call will be encoded as a kern_open event type.

FIG. 1 depicts four types of nodes, each having a different shape.

An input node, as indicated by letter "A", for example, with reference to filter_node_change 145. An input node is a logical representation of an input point into the event flow diagram. Events enter the event flow diagram through an input node. When the idscor process receives an audit record from the idskerndsp process it will encode it as an event which will enter the template via the input node.

A filter node, as indicated by letter B. A filter node will act upon an event presented to its input port. It will pass the event out of one of its two output ports: a true port and a false port. A condition encoded in the filter node determines whether the event will transit through the node and exit via the true or false output port.

A create node, as indicated by letter C, for example, with reference to create_warning_megaReadOnly 400. A create node creates a new event when an event is presented at its input port. The newly created event is sent out of the create node's output port.

An output node, as indicated by letter D, for example, with reference to alerts 450. An output node presents an exit point for events from the flow diagram. When an event reaches an output node it leaves the event flow diagram and is absorbed by the idscor process.

The template as illustrated in the event flow diagram in FIG. 1 includes three logical areas:

1. Event Input

Gather the events required to determine if an intrusion has occurred. Each event input node is configured to receive one specific type of event. The type of the event which the node is configured to receive is shown in the name of the node on the diagram illustrated in FIG. 1. The parameters passed to the system call are encoded as field entries in the event structure.

2. Filtering of Events

Filter any events that are not required based on the specific parameters in the event.

3. Output Creation

Create an output event containing the intrusion alert derived from the parameters of the input events, and the analysis performed on them.

If any one of these system calls is present in the input data to idscor, this template will receive that system call as an event through the appropriately named input. For example, if the ftruncate( ) system call is executed, an ftruncate event is created and will enter the event flow diagram via the input node name ftruncate.

Each logical group of nodes in the event flow diagram in FIG. 1 is explained below. Each explanation covers a set of one or more input nodes, connected to a filter node, and optionally connected to a create node.

The permission bits on a file in UNIX determine which users are allowed to read-write-execute the file. This set of nodes handle the case where an attempt is made to change permissions on a file.

chmod 100

Change the ownership of a file given the file name fchmod 105

Change the ownership of a file given a file descriptor returned from the open( ) call lchmod 110

Change the ownership of a symbolic link the link name filter_mode_change 115

This filter node accepts input events of type chmod, fchmod or lchmod. The logic in the filter node will pass the input event to the output port if the parameters to the system call indicate that the permission bits on a file or directory were changed.

For example, if an event representing the chmod( ) system call indicates that the system call succeeded, and that the permission bits on the file referenced had changed, then the chmod input event is passed to the output port of the filter_mode_change node.

As a counter-example, if an event representing the chmod system call arrived at the input port of filter_mode_change 115, but the chmod( ) call did not change the permission bits on the file referenced, the filter_mode_change node 115 would drop the event.

The open( ) system call can create files, truncate existing files, append to existing files, or write to an existing file. These nodes contain the logic to filter all of these cases.

open_event 120

Open a file for reading, writing, truncation, appending, or create a new file.

filter_open_flags 125

This filter node accepts input events of type open, and will pass the input event to the output port if the parameters passed to the open call indicate that the caller attempted to create a file, truncate an existing file, write over an existing file, or append to an existing file.

For example, if an event representing the open( ) system call indicates that a file was opened for truncation (by passing the O_TRUNC flag to the open( ) call), then the open event present on the input event of the filter_open_flags filter node 125 will be passed to the output port of the node.

Each file in a UNIX system has a user who owns the file, and a group ownership entry. These nodes handle any changes made to either the user ownership or group ownership of a file.

chown 130

Change the permission settings on a file given the filename fchown 135

Change the permission settings on a file given a file descriptor returned from the open( ) call lchown 140

Change the permission settings on a symbolic link file given the name of the symbolic link filter_owner_change 145

This filter node accepts inputs events of type chown, fchown or lchown. The logic in the filter node will pass the input event to the output port if the parameters encoded in the event indicate that the ownership or group ownership of the file has been changed.

The UNIX filesystem supports both symbolic links and hardlinks. A link is a named reference to another file. Every link has a name, and appears to be identical to a regular file.

link 150

Create a hard link in the filesystem symlink 155

Create a symbolic link from one file to another filter_link_success 160

This filter node accepts input of type link or symlink. It will pass the input events to its output port if the system call was successful.

create_fileinfo_links 165

This create node extracts the derived filename for the target of the link and modifies the input event to replace the filename recorded from the system call with this data.

These next two create nodes cover the case for when a file is renamed. The file that was renamed, and the name it was renamed to are both recorded. Two input nodes are used: a rename event input node 170 will feed the rename event into logic that will extract the name of the file which was renamed. The rename_event input node 170 will feed the same rename event into logic which will extract the name which the file was renamed to. Both events are then fed into the alert creation logic, and so two alert messages will be created by the create_warningMegaReadOnly create node 400, even though only one rename event entered the template.

rename_event 170 rename 172

Rename a file from its existing name to a new name filter_rename_success 175

This filter node accepts inputs of type rename (rename( ) system call events) and will pass an input event to the output port if the outcome field in the event record indicates that the system call was successful.

create_fileinfo_rename 180

The following nodes handle all other cases in which a file or directory may be modified.

unlink 185

Delete a file given its file name via the unlinko call.

creat 190

Create a file given a filename mkdir 195

Create a directory given its name rmdir 200

Delete a directory given its name mknod 205

Create a device special file, a pipe or a FIFO device truncate 210

Truncate a file to be zero length given its filename truncate64 215

Truncate a file in a 64 bit filesystem to be zero length given its filename ftruncate 220

Truncate a file to be zero length given a file descriptor returned from the open( ) call ftruncate64 225

Truncate a file in a 64 bit filesystem to be zero length given a file descriptor returned from the open( ) call filter_no_error 230

This filter node will pass an event on its input port to its output port if the outcome field in the event indicates that the event was successful, i.e. that the system call encoded in the event record did not fail.

create_fileinfo 235

This create node gathers the required filename information from the event record. It creates a new event and passes it from its output port containing the filename referenced in the input event.

While the template described herein provides a generic mechanism for detecting file and directory changes, to be truly useful as a security tool it must allow for configuration of which files and directories should be considered unmodifiable. For example, certain files are critical to a system's operation (e.g. the password file /etc/passwd) and any tampering with these files could result in a catastrophic system failure. Other files and directories are less critical (e.g. the temporary directory /tmp) and can safely be ignored by the logic in the template.

To provide the most flexibility, the template allows for four selection criteria to be applied to files and directories to determine if they are or are not to be considered critical:

files-to-include 300

A list of files to consider critical. Any modifications to a file named in this list will immediately result in an alert message being generated.

files-to-exclude 310

A list of files that are deemed non-critical. If the file is present in a directory that is deemed critical, if its name is present in this list then no alert message will be generated if the file is modified.

directories-to-include 320

A list of directories that are considered critical. Any modifications to a file or subdirectory of a directory named in this list will immediately result in an alert message being generated.

directories-to-exclude 330

A list of directories that are deemed non-critical. If a modification occurs to a file or subdirectory of a directory named in this list then no alert message is generated.

If a file is explicitly included in the files-to-include then any change will be logged. This pattern ignores the exclusion clauses for explicit listings of files only.

If a file is not explicitly included, but its directory is then any change will be logged only if:

1) The directory is not explicitly excluded, and
2) The file is not explicitly excluded by name.

For example, if the following values are set:

files-to-include=[/etc/passwd, /etc/foo/conf/nochange]
files-to-exclude=[/etc/ptmp]
directories-to-include=[/etc, /bin]
directories-to-exclude=[/etc/foo/conf]

Then if a change was made to /etc/foo/conf/changeable, no alert would be generated because the directory /etc/foo/conf is explicitly excluded.

If /etc/foo/conf/nochange was modified, an alert would be generated because that file is explicitly listed, even though the directory is excluded.

If /etc/ptmp is modified, no alert is generated because it is specifically excluded.

If /etc/rc.config.d/lp is modified an alert is generated.

The logic in the following filter nodes implements the include/exclude functionality described above.

filter_include_files 300

This filter node has two outputs configured: the upper right output port on the node is the "true" port, and the lower right output port is the "false" port. If an input event matches the criteria in the filter condition in the node then it will transit out from the upper right "true" port. If the input event does not match the filter condition then the event will transit out from the lower right "false" port.

The logic of the node is thus: if the filename encoded in the input event matches a filename listed in the list files-to-include (i.e. file names which are considered critical and any modifications to them should result in an alert), it will output from the "true" port and an alert message will be generated by the create_warning_megaReadOnly create node. If the filename does not match the list of files to include it will transit out from the "false" port and further filter nodes will determine if the other filter conditions should lead to an alert being generated.

filter_include_directories 320

This filter node will compare the filename encoded in the event record to the list of directories considered critical, specified in the directories-to-include list. If the filename encoded in the event matches this list (i.e. if the file or directory name is present in this directory, or any of its sub-directories) then the input event transits from the output port of the filter node for further filtering. If the filename encoded in the event does not match any directories in the list the event record is dropped and no further processing occurs.

filter_exclude_files 310

This filter node will compare the filename encoded in the event record to the list of files to exclude listed in the list files-to-exclude. If the filename does not match any listed then the input event will transit from the output port of the node for further filtering. If the filename does match a filename listed in the files-to-exclude list then the input event record is dropped and no further processing occurs.

filter_exclude_directories 330

This filter node will compare the filename encoded in the event record to the list of directories to exclude listed in the list directories-to-exclude. If the filename does not match any listed then the input event will transit from the output port of the node for further filtering. If the filename does match a directory listed in the directories-to-exclude list then the input event record is dropped and no further processing occurs.

create_warning_megaReadOnly 400

This create node will create the alert text indicating that a file or directory modification has occurred. It will gather the information it needs from the input event and create a text message that describes the type of modification, what file or directory was modified, who modified it, when it was modified, and how it was modified.

The text message describing the action taken will depend on the type of the system call as encoded in the input event record. The following table shows which textual message is chosen for a given system call:

"kern_open"=>"opened for modification/truncation"
"kern_creat"=>"created the file (and overwrote any existing file) named"
"kern_truncate"=>"truncated the file"
"kern_truncate64"=>"truncated the file"
"kern_ftruncate"=>"truncated the file"
"kern_ftruncate64"=>"truncated the file"
"kern_unlink"=>"deleted the file"
"kern_rename"=>"renamed the file"
"kern_rename2"=>"renamed a file to"
"kern_mkdir"=>"created the directory"
"kern_rmdir"=>"deleted the directory"
"kern_link"=>"created as a hard link"
"kern_symlink"=>"created a symbolic link"
"kern_fchmod"=>"changed the permissions of"
"kern_lchmod"=>"changed the permissions of"
"kern_chmod"=>"changed the permissions of"
"kern_fchown"=>"changed the owner of"
"kern_lchown"=>"changed the owner of"
"kern_chown"=>"changed the owner of"

A sample alert messages are shown below. Each field of the alert text is separated by a percent "%" character. The recipient of the alert message can parse the alert message to extract each field by scanning for "%" characters.

%02:FILESYSTEM %Non-owned file being modified%User 0 opened for modification/truncation "/dev/ptym/clone" owned by UID:2 executing /usr/bin/X11/hpterm (1,470,"40000007") with arguments ["/usr/bin/X11/hpterm", "-fn", "6×13", "-sb", "-ls", "-display", "15.13.190.28:0", "-name", "hpterm%20(ariel%20via%20TELNET)"] as PID:4164

By default the following files and directories are configured:

files-to-include
  /stand/vmunix
  /stand/kernrel
  /stand/bootconf
    This is the system kernel and its configuration files. Changes made to these files will affect the system at the next kernel configuration or system reboot.
  /etc/passwd
  /etc/group
    These files define the users on a system. Changes to /etc/passwd can create accounts, including accounts with superuser access.
  /etc/inetd.conf
    This file controls what network services are running, and what programs are used to fulfill the service requests. An attacker might change this file to open up a backdoor that they can access over the network.
  /.rhosts
  /.shosts
    These files are used to control the remote access of the user 'root' without requiring a password. One technique used to create a backdoor is to modify these files to permit root access without a password from anywhere.

files-to-exclude
  /etc/ptmp
  /etc/.pwd.lock
    These are temporary files created by the program 'vipw' and are not used for any system configuration.

directories-to-include
  /bin
  /sbin
  /usr/bin
    These directories hold the system supplied binaries.
  /lib
    These are the system libraries that control the way that most user and system programs behave.
  /opt
    This is where software packages are installed.
  /etc
    This is where most of the system configuration files are stored.
  /stand
    This is where most of the kernel configuration data is stored.

directories-to-exclude
  /etc/opt/resmon

Figure 2:
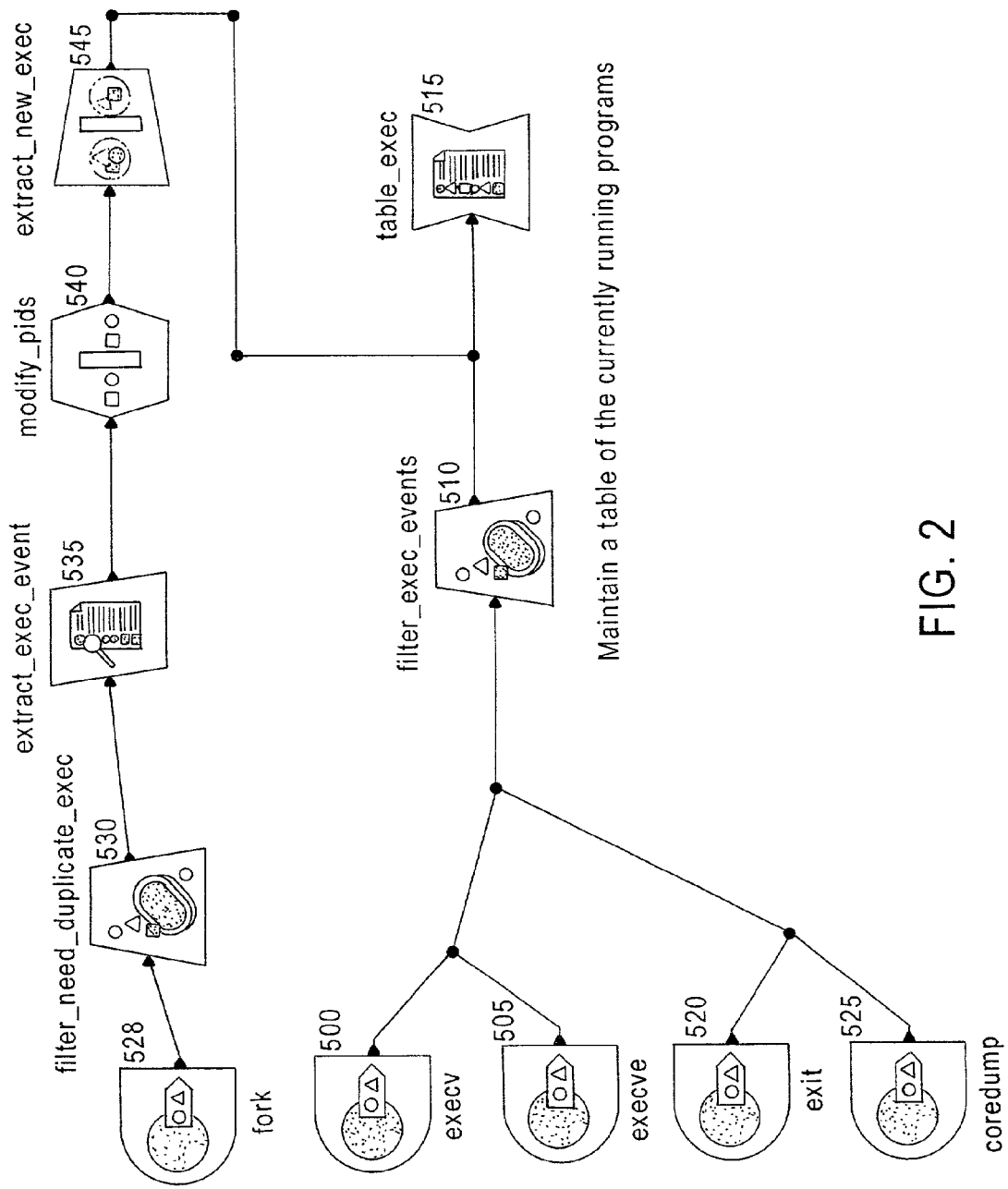
FIG. 2 is an event flow diagram illustrating a tracking process for tracking process ID mapping to program filenames.

Referring now to FIG. 2, a requirement for each detection template in the IDS system is that it can report the full pathname of the program used to conduct any intrusive activity. For example, if a file or directory is changed or modified, the executable program which makes the change must be included in the intrusion report.

The UNIX operating system uses the concept of a Process ID, termed a PID, to keep track of each process on the system. A running process has a unique PID assigned to it for the duration of its execution life. However as soon as the process exits its process ID may be reused for another process. Thus PIDs are unique only for the lifetime of a process, not for the lifetime of the system as a whole.

The purpose of the process tracking sub-component of each detection template is to track the invocation of a process on the UNIX system, and at the time of invocation record the full pathname of the executable program used to execute the process.

For example, the file /usr/bin/vi stored on the filesystem contains code for the editor program vi. A user executes the editor program and the UNIX system assigns the process ID of 3456 to the process image while the editor program is running. Thus, the PID 3456 maps to the filename "/usr/bin/vi". However, once process 3456 exits, the mapping entry must is no longer valid.

The mapping between the process ID (PID) and the full pathname of the executable is stored in a table. Each process executing on the system corresponds to exactly one table.

Thus the conditions to be tracked are:

1. A program is invoked and assigned a process ID. The process ID and associated full pathname are recorded in the table.
2. A process which is currently executing exits normally. The mapping entry for that process ID must be removed from the table.
3. A process which is currently executing forks a duplicate copy of itself with a new process ID. A copy of the record must be made in the table mapping the new process ID to the original pathname.
4. A process which is currently execution exits abnormally. The mapping entry for that process ID must be removed from the table.

Design of the template is depicted in FIG. 2.

FIG. 2 presents a visual overview of the template design based on an "event flow" model. Events flow from left-to-right through the nodes in the diagram, and they only flow along the connecting lines.

When an event arrives at the input port (on the left hand side) of a node it is processed by that node's logic. The logic embedded in the nodes in the event flow diagram contains the algorithm used to detect file and directory changes.

An event may leave a node on its output port (on the right hand side). Some nodes may create a new event on their output ports, others may forward the event that arrived at their input port. Some nodes (filter nodes) may block the input event from transitioning onto the output port.

"Events" in this context are kernel audit records read from the IDDS subsystem. Each event contains exactly one kernel audit record, which pertains to exactly one system call invocation by a process. As described in patent applications entitled "METHOD OF GENERATING AND PRESENTING KERNEL DATA" and "CIRCUITS FOR INTRUSION DETECTION SYSTEM", a kernel audit record contains a number of fixed header fields, followed by a variable body portion. Each field in the fixed header, and in the variable body portion, has an entry in the event structure used in this template design.

The type of an event is equivalent to the system call information encoded in the event. For example, an open( ) system call will be encoded as a kern open event type.

FIG. 2 depicts five types of nodes:

1. An input node. An input node is a logical representation of an input point into the event flow diagram. Events enter the event flow diagram through an input node. When the idscor process in the IDDS receives an audit record from the idskerndsp process it will encode it as an event which will enter the template via the input node.

2. A filter node. A filter node will act upon an event presented to its input port. It will pass the event out of one of its two output ports: a true port and a false port. A condition encoded in the filter node determines whether the event will transit through the node and exit via the true or false output port.

3. An extract node.
4. A modify node.
5. A rearrange node.

If any one of these system calls is present in the input data to idscor, this template will receive that system call as an event through the appropriately named input. For example, if the execv( ) system call is executed, an execv event is created and will enter the event flow diagram via the input node named execv 500.

Storage of the mapping from a PID to a program's filename is handled by the nodes described below.

execv 500
   Execute a program using the exec( ) system call.

execve 505
   Execute a program and specify its environment using the execve( ) system call.

filter_exec_events 510

Pass only successful exec, execve, exit or coredump events. If the event record indicates that the system call returned with no error then the event present on the input port of the filter node Transits to the output port of the filter. If the event record indicates that the system call returned an error or failed for any reason then the event record is dropped and does not appear on the output port of the filter node.

table_exec 515
   The process ID to program filename mapping is stored in this table node. A table node represents a list of entries, with each entry corresponding to one event record. The contents of a table node can be queried by other nodes in the event flow diagram. For example, the extract_exec_event node 535 can query the table_exec table node 515 to determine if an entry is already present in the table.

Three parameters define the operation of the table_exec table node:

Max Events
   The maximum number of events that will be stored in the table.

Save Until
   How long each event will remain in the table (the event's lifetime).

Delete condition
   How to choose which events to discard from the table.

The settings in table_exec 515 are:

Max Events: unlimited

Save Until: 24 hours

Delete Condition: If an exec event record or an execve event record arrive at the input port of the table node then delete a table entry if its PID field is equal to the PID field of the event at the input port. Thus the table will always contain the single latest mapping between a given PID and the filename it corresponds to. Moreover, if an exit event record or a coredump event record arrive at the input port and they have the same PID as a table entry, then delete that table entry. Thus the table only contains an entry for each executing process on the system, and never for a process which is not currently executing.

When a process exits the following nodes are used:

exit 520

Create an exit event record to record the exit( ) system call.

coredump 525

Create a coredump event record to record the details of a process exiting abnormally because of an error condition.

When a process creates a copy of itself using the UNIX fork( ) system call 528, the entry in the table must be duplicated.

filter_need_duplicate_exec 530

This filter node will pass the fork event record present on its input port to its output port if a table entry for the process ID recorded in the fork event record exists in the table_exec table node 515. If no table entry is found in the table_exec table 515 then the input event record is discarded and does not transit to the output port.

extract_exec_event 535

An extract node queries a table and copies an event from it based on the logic encoded in the node and the contents of the event record present on the input port. In doing so it appends the newly modified event on to the end of the input event, so the output event is logically a pair of events: (input event, modified event).

The extract_exec_event node 535 will retrieve a copy of the PID to filename mapping entry in the table_exec table 515 for the event record on its input port and will transit that event out from its output port.

modify_pids 540

A modify node will modify the contents of the event present on its input port and pass the modified event on to its output port. The modify_pids node 540 receives an event from the extract_exec_event which is logically composed of two events. It will modify the second event in the pair to contain the process ID of the first event in the pair. In doing so it creates a duplicate copy of a PID to filename mapping from the table_exec table 515, and modifies the PID entry to refer to the newly created process. The modified event pair transit onto the output port of the modify_pids node.

extract_new_exec 545

The rearrange node extract_new_exec 545 receives an event pair on its input port and then choose the second of the events from the pair and transits that event onto its output port.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of detecting critical file changes, comprising:
generating a read request for an event representing at least one system call, wherein the event is a kernel audit record removed from a buffer of an intrusion detection data source (IDDS);
reading the requested event;
routing the event to a template, the event comprising multiple parameters and the template comprising a sequence of connected logic nodes comprising at least one input node, at least one filter node, and at least one output node;
filtering the event, based on the sequence of logic nodes of the template, as a possible intrusion based on the multiple parameters and either dropping the event or outputting the event, the filtering comprising:
determining a filename based on the event;
outputting the event for each event indicating modification of a critical file based upon the determined filename; and
creating an intrusion alert for each event output from said filtering.

2. The method of claim 1, wherein said filtering further comprises providing the event to the determining a filename for each event comprising a parameter indicating modification of a permission bit on a file or directory.

3. The method of claim 1, wherein said filtering further comprises providing the event to the determining a filename for each event comprising a parameter indicating opening a file for truncation.

4. The method of claim 1, wherein said filtering further comprises providing the event to the determining a filename for each event comprising a parameter indicating modification of the ownership or group ownership of a file.

5. The method of claim 1, further comprising an alert message for each renamed file including the filename of the file and the new filename of the renamed file.

6. The method of claim 1, comprising configuring a template based on a list of files and directories to be included or excluded based on whether the files and directories are considered unmodifiable.

7. The method of claim 1, wherein said filtering further comprises determining a subdirectory of a directory based on the event and outputting the event for each event indicating modification to the determined subdirectory.

8. The method of claim 1, wherein said reading an event comprises reading an event from an event-driven correlation service of the IDDS.

9. A computer-readable medium storing instructions which, when executed by a processor, cause the processor to implement the method steps of claim 1.

10. A system for detecting critical file changes, comprising:
a processor; and
a memory storing instructions which, when executed by the processor, cause the processor to:
generate a read request for an event from an intrusion detection data source (IDDS), wherein the event is a kernel audit record removed from a buffer;
reading the requested event;
route events to a template, wherein the event comprises one or more parameters and the template comprises a sequence of connected logic nodes comprising at least one input node, at least one filter node, and at least one output node,
filter the event, based on the template, as a possible intrusion based on one of the one or more parameters and either dropping the event or outputting the event, wherein the instructions causing the processor to filter the event comprise instructions causina the processor to determine a filename based on the event and output the event for each event indicating modification of a critical file based upon the determined filename and create an intrusion alert for each event output from the filter.

11. The system of claim 10, wherein the instructions causing the processor to filter the event comprise instructions causing the processor to provide the event to the determine a filename instructions for each event comprising one of the one or more parameters indicating modification of the permission bits on a file or directory.

12. The system of claim 10, wherein the instructions causing the processor to filter the event comprise instructions causing the processor to provide the event to the determine a filename instructions for each event comprising one of the one or more parameters indicating that a file was opened for truncation.

13. The system of claim 10, wherein the instructions causing the processor to filter the event comprise instructions causing the processor to provide the event to the determine a filename instructions for each event comprising one of the one or more parameters indicating modification of the ownership or group ownership of a file.

14. The system of claim 10, wherein the instructions further comprise instructions causing the processor to output an alert message for each renamed file, the alert message comprising the filename of the file and the filename of the renamed file.

15. The system of claim 10, wherein the instructions causing the processor to configure a template based on a list of files and directories to be included or excluded based on whether the files and directories are considered unmodifiable.

16. The system of claim 10, wherein the instructions causing the processor to filter the event comprise instructions causing the processor to determine a subdirectory of a directory based on the event and output the event for each event indicating modification to a predetermined subdirectory of a directory.

17. The system of claim 10, wherein the instructions causing the processor to read an event comprise instructions causing the processor to read an event from an event-driven correlation service of the IDDS.

* * * * *

UNITED STATES PATENT AND TRADEMARK OFFICE
CERTIFICATE OF CORRECTION

PATENT NO. : 7,577,998 B1  Page 1 of 1
APPLICATION NO. : 09/987911
DATED : August 18, 2009
INVENTOR(S) : Mark Crosbie et al.

It is certified that error appears in the above-identified patent and that said Letters Patent is hereby corrected as shown below:

In column 12, line 28, in Claim 5, delete "comprising" and insert -- comprising outputting --, therefor.

In column 12, line 64, in Claim 10, delete "causina" and insert -- causing --, therefor.

In column 12, line 67, in Claim 10, delete "filename" and insert -- filename, --, therefor.

Signed and Sealed this

Twenty-third Day of March, 2010

David J. Kappos
*Director of the United States Patent and Trademark Office*